United States Patent [19]
Tyrpin et al.

[11] Patent Number: 6,080,432
[45] Date of Patent: *Jun. 27, 2000

[54] CHEWING GUM COMPOSITION CONTAINING SODIUM GLYCINATE AND METHOD OF MAKING A CHEWING GUM PRODUCT THEREFROM

[75] Inventors: Henry T. Tyrpin, Palos Park, Ill.; Fred R. Wolf, West Des Moines, Iowa

[73] Assignee: Wm. Wrigley Jr. Company, Chicago, Ill.

[ * ] Notice: This patent is subject to a terminal disclaimer.

[21] Appl. No.: 09/308,973

[22] PCT Filed: Dec. 23, 1996

[86] PCT No.: PCT/US96/20329

§ 371 Date: May 27, 1999

§ 102(e) Date: May 27, 1999

[87] PCT Pub. No.: WO98/23167

PCT Pub. Date: Jun. 4, 1998

[51] Int. Cl.7 ...................................................... A32G 3/30
[52] U.S. Cl. .................................................... 426/3; 426/5
[58] Field of Search ........................... 426/3, 6, 5; 424/48

[56] References Cited

U.S. PATENT DOCUMENTS

| | | |
|---|---|---|
| 3,617,307 | 11/1971 | Inklaar . |
| 3,808,051 | 4/1974 | Schoenholz et al. ........................ 134/2 |
| 3,897,567 | 7/1975 | Inklaar ........................................ 426/8 |
| 3,904,585 | 9/1975 | Thunberg et al. .................. 260/534 R |
| 3,947,496 | 3/1976 | Thunberg et al. .................. 260/534 R |
| 3,985,801 | 10/1976 | Thunberg et al. .................. 260/534 R |
| 4,001,453 | 1/1977 | Huber et al. ............................. 426/533 |
| 4,064,274 | 12/1977 | Mackay et al. ............................... 426/3 |
| 4,263,327 | 4/1981 | Pedersen et al. ............................ 426/3 |
| 4,315,918 | 2/1982 | Gayst et al. ............................. 424/177 |
| 4,656,031 | 4/1987 | Lane et al. ................................ 424/49 |
| 4,749,561 | 6/1988 | Lane et al. ................................ 424/49 |
| 4,749,562 | 6/1988 | Lane et al. ................................ 424/49 |
| 4,822,597 | 4/1989 | Faust et al. ................................ 424/48 |
| 4,978,537 | 12/1990 | Song ............................................ 426/5 |
| 4,997,659 | 3/1991 | Yatka et al. ................................. 426/3 |
| 5,009,893 | 4/1991 | Cherukuri et al. ....................... 424/440 |
| 5,013,716 | 5/1991 | Cherukuri et al. ...................... 426/648 |
| 5,118,510 | 6/1992 | Kuhrts .................................... 424/451 |
| 5,139,794 | 8/1992 | Patel et al. .................................. 426/3 |
| 5,154,939 | 10/1992 | Broderick et al. .......................... 426/5 |
| 5,192,563 | 3/1993 | Patel et al. .................................. 426/5 |
| 5,372,824 | 12/1994 | Record et al. .............................. 426/3 |
| 5,389,360 | 2/1995 | Mobley et al. ............................ 424/49 |
| 5,523,105 | 6/1996 | Ishikawa et al. ........................ 426/538 |

FOREIGN PATENT DOCUMENTS

| | | |
|---|---|---|
| 1991-251533 | 11/1991 | Japan . |
| WO 98/23165 | 6/1998 | WIPO . |
| WO 98/23166 | 6/1998 | WIPO . |
| WO 98/23167 | 6/1998 | WIPO . |

OTHER PUBLICATIONS

Glycine and Its Derivatives, A Survey of Potential Applications, Food Tec. (4) pp. 13–17 (1989) (Abstract).

*Primary Examiner*—Arthur L. Corbin
*Attorney, Agent, or Firm*—Steven P. Shurtz; Brinks Hofer Gilson & Lione

[57] ABSTRACT

A chewing gum composition comprising about 5% to about 95% gum base; about 5% to about 95% bulking and sweetening agents; about 0.1% to about 15% flavor; and about 0.02% to about 5% sodium glycinate.

17 Claims, No Drawings

CHEWING GUM COMPOSITION CONTAINING SODIUM GLYCINATE AND METHOD OF MAKING A CHEWING GUM PRODUCT THEREFROM

BACKGROUND OF THE INVENTION

The present invention relates to methods for producing chewing gum. More particularly the invention relates to producing chewing gum containing sodium glycinate, which has been discovered to be a bitterness inhibitor.

Chewing gum compositions often contain ingredients that impart a bitter taste to the chewing gum. Caffeine gives a bitter taste when used in gum. Some typical chewing gum flavoring agents, such as menthol, spearmint oil and peppermint oil, give a bitter taste. Medicants sometimes added to chewing gum also give a bitter taste to the gum.

There are many known bitterness inhibitors, and many of them have been suggested for use in chewing gum, such as those disclosed in U.S. Pat. Nos. 4,822,597 and No. 5,192,563, and Japanese Patent Publication No. 91-251533. Also, the use of flavoring ingredients which have been modified to reduce bitterness have been used in chewing gum, such as disclosed in U.S. Pat. Nos. 5,009,893; No. 5,372,824 and No. 5,523,105. Still there is a need for a better bitterness inhibitor which can be used in chewing gum to reduce the bitterness of the taste of some chewing gums.

SUMMARY OF THE INVENTION

The present invention comprises, in a first aspect, a chewing gum composition comprising about 5% to about 95% gum base; about 5% to about 95% bulking and sweetening agents; about 0.1% to about 15% flavor; and about 0.02% to about 5% sodium glycinate.

In another aspect, the present invention comprises a method of making a chewing gum product with reduced bitterness comprising the steps of mixing about 5% to about 95% gum base, about 5% to 95% bulking and sweetening agents, and about 0.1% to about 15% flavor to form a chewing gum composition, the chewing gum including an ingredient which gives the chewing gum composition a bitter taste; while making the gum composition, adding sodium glycinate in an amount sufficient to provide the gum composition with suppressed bitterness.

Chewing gum made with sodium glycinate gives a flavor that is less harsh and less bitter. This sodium salt seems to have a greater impact on reducing bitterness than other sodium salts. At levels of 0.02% to 5%, sodium glycinate has been found to act as a bitterness inhibitor without imparting a salty taste.

In addition, it has been discovered that sodium glycinate acts as a gum softener during early and intermediate chew stages. Lower levels are better to inhibit bitterness and higher levels give softener gum.

DETAILED DESCRIPTION OF THE PRESENTLY PREFERRED EMBODIMENTS

As used herein, the term "chewing gum" also includes bubble gum and the like. All percentages are weight percentages unless otherwise specified.

Sodium glycinate is made by reacting glycine with sodium hydroxide to form the salt. A purified food grade sample of sodium glycinate was obtained from Seltzer Chemicals, Inc. 5927 Gerger Court, Carlsbad, Calif. Since other sodium salts have been found to reduce bitterness in food products, and since glycine is an aminoacetic acid and is a sweet protein, it was speculated that sodium glycinate may have some unique properties for bitterness reduction. Sodium glycinate has been used in pharmaceuticals and some dentifrices, but has found only limited use in food products such as meats. Its use in food and pharmaceuticals is generally related to it being an alkalinizer. It has been discovered that when sodium glycinate is added to chewing gum at levels of about 0.02% to about 5%, preferably about 0.05% to 2%, and most preferably about 0.1% to 1%, the product has an improved flavor quality and a softer texture. This sodium salt improves flavor by reducing bitterness of the flavor ingredients such as menthol and physiological cooling agents. If bitter stimulants or pharmaceuticals such as caffeine were used in the gum, sodium glycinate would also reduce this bitterness.

Like mono-sodium glutamate (MSG), which is also a sodium salt of an aminocarboxylic acid, sodium glycinate has an effect on taste properties. However, unlike sodium glutamate, which has its own characteristic taste qualities, sodium glycinate is more bland in taste. This bland taste allows it to be used at higher levels in chewing gum without effecting overall gum flavor quality.

Sensory tests also suggested that sodium glycinate may act as a gum softener. When used at the levels indicated above, sodium glycinate gives a softer gum product and acts like an emulsifier to effect the overall texture of gum.

There may be advantages of having the rate of release of the sodium glycinate from chewing gum modified. For example, if sodium glycinate is added to chewing gum to reduce the bitterness of an ingredient which releases slowly from chewing gum, then the sodium glycinate may preferably be treated to delay its release from the chewing gum. Alternatively, there may be instances in which the release rate would preferably be increased.

Not only would a delayed release of the bitterness inhibitor be effective for caffeine, and bitter medicaments but also when used with high menthol type gum flavors. Menthol is a common ingredient in peppermint flavor that causes a bitterness in gum in the later stages of chewing. A delayed release bitterness inhibitor can reduce this flavor bitterness in the later stages.

The release rate of the bitterness inhibitor should be designed to release with the ingredient for which it is masking bitterness, whether it be a flavor, a stimulant like caffeine, or a medicant. In some instances, the bitterness inhibitor may be co-encapsulated with the bitter causing agent to release together during the chewing period. If desired, high intensity sweeteners may be added to this mixture to further reduce bitterness and obtain an acceptable product.

The bitterness inhibitor can be added to chewing gum as a powder, as an aqueous dispersion, or dispersed in glycerin, propylene glycol, corn syrup, hydrogenated starch hydrolyzate, or any other compatible aqueous dispersion.

For aqueous dispersions, an emulsifier can also be mixed in the solution with the bitterness inhibitor and the mixture added to a chewing gum. A flavor can also be added to the bitterness inhibitor/emulsifier mixture. The emulsion formed can be added to chewing gum. The bitterness inhibitor in powder form may also be mixed into a molten chewing gum base during base manufacture or prior to manufacture of the gum. The bitterness inhibitor may also be mixed with base ingredients during base manufacture.

As stated previously, physical modifications of the bitterness inhibitor by encapsulation with highly water soluble substrates will increase its release in chewing gum by increasing the solubility or dissolution rate. Any standard technique which gives partial or full encapsulation can be used. These techniques include, but are not limited to, spray drying, spray chilling, fluid-bed coating and coacervation. These encapsulation techniques may be used individually in a single-step process or in any combination in a multiple step process. The preferred technique for fast release of the bitterness inhibitor is spray drying.

The bitterness inhibitor may also be encapsulated or entrapped to give a delayed release from chewing gum. A slow, even release can give a reduced bitterness over a long period of time and blend more easily with longer lasting flavors and sweeteners. The bitterness inhibitor may be encapsulated with sweeteners, specifically high-intensity sweeteners such as thaumatin, dihydrochalcones, acesulfame K, aspartame, sucralose, alitame, saccharin and cyclamates.

The encapsulation techniques described herein are standard coating techniques and generally give varying degrees of coating from partial to full coating, depending on the coating composition used in the process. Generally, compositions that have high organic solubility, good film-forming properties and low water solubility give better delayed release, while compositions that have high water solubility give better fast release. Such low water-solubility compositions include acrylic polymers and copolymers, carboxyvinyl polymer, polyamides, polystyrene, polyvinyl acetate, polyvinyl acetate phthalate, polyvinylpyrrolidone and waxes. Although all of these materials are possible for encapsulation of the bitterness inhibitor, only food-grade materials should be considered. Two standard food-grade coating materials that are good film formers but not water soluble are shellac and Zein. Others which are more water soluble, but good film formers, are materials like agar, alginates, a wide range of cellulose derivatives like ethyl cellulose, methyl cellulose, sodium hydroxymethyl cellulose, and hydroxypropylmethyl cellulose, dextrin, gelatin, and modified starches. These ingredients, which are generally approved for food use, may give a fast release when used as an encapsulant for the bitterness inhibitor. Other encapsulants like acacia or maltodextrin can also encapsulate the bitterness inhibitor and give a fast release rate from gum.

The amount of coating or encapsulating material on the bitterness inhibitor may also control the length of time for its release from chewing gum. Generally, the higher the level of coating and the lower the amount of active bitterness inhibitor, the slower the release during mastication with low water soluble compositions. The release rate is generally not instantaneous, but gradual over an extended period of time. To obtain the delayed release to blend with a gum's flavor release, the encapsulant should be a minimum of about 20% of the coated bitterness inhibitor. Preferably, the encapsulant should be a minimum of about 30% of the coated bitterness inhibitor, and most preferably should be a minimum of about 40% of the coated bitterness inhibitor. Depending on the coating material, a higher or lower amount of coating material may be needed to give the desired release.

Another method of giving a modified release of the bitterness inhibitor is agglomeration with an agglomerating agent which partially coats the bitterness inhibitor. This method includes the step of mixing the bitterness inhibitor and an agglomerating agent with a small amount of water or other solvent. The mixture is prepared in such a way as to have individual wet particles in contact with each other so that a partial coating can be applied. After the water or solvent is removed, the mixture is ground and used as a powdered, coated bitterness inhibitor.

Materials that can be used as the agglomerating agent are the same as those used in encapsulation mentioned previously. However, since the coating is only a partial encapsulation, some agglomerating agents are more effective in increasing the bitterness inhibitor's release than others. Some of the better agglomerating agents for delayed release are the organic polymers like acrylic polymers and copolymers, polyvinyl acetate, polyvinylpyrrolidone, waxes, shellac and Zein. Other agglomerating agents are not as effective in giving a delayed release as are the polymers, waxes, shellac and Zein, but can be used to give some delayed release. Other agglomerating agents that give a fast release include, but are not limited to, agar, alginates, a wide range of water soluble cellulose derivatives like ethyl cellulose, methyl cellulose, sodium hydroxymethyl cellulose, hydroxypropylmethyl cellulose, dextrin, gelatin, modified starches, and vegetable gums like guar gum, locust bean gum and carrageenan. Even though the agglomerated bitterness inhibitor is only partially coated, when the quantity of coating is increased compared to the quantity of bitterness inhibitor, the release of bitterness inhibitor can also be modified for mastication. The level of coating used in the agglomerated product is a minimum of about 5%. Preferably, the coating level is a minimum of about 15% and more preferably about 20%. Depending on the agglomerating agent, a higher or lower amount of agent may be needed to give the desired release of bitterness inhibitor.

The bitterness inhibitor may be coated in a two-step process or a multiple step process. The bitterness inhibitor may be encapsulated with any of the materials as described previously and then the encapsulated bitterness inhibitor can be agglomerated as previously described to obtain an encapsulated/agglomerated/bitterness inhibitor product that could be used in chewing gum to give a delayed release of the bitterness inhibitor.

In another embodiment of this invention, the bitterness inhibitor may be absorbed onto another component which is porous and becomes entrapped in the matrix of the porous component. Common materials used for absorbing the bitterness inhibitor include, but are not limited to, silicas, silicates, pharmasorb clay, spongelike beads or microbeads, amorphous carbonates and hydroxides, including aluminum and calcium lakes, all of which result in a delayed release of the bitterness inhibitor. Other water soluble materials including amorphous sugars such as spray-dried dextrose, sucrose, alditols and vegetable gums and other spray-dried materials result in a faster release of the bitterness inhibitor.

Depending on the type of absorbent materials and how it is prepared, the amount of the bitterness inhibitor that can be loaded onto the absorbent will vary. Generally materials like polymers or spongelike beads or microbeads, amorphous sugars and alditols and amorphous carbonates and hydroxides absorb about 10% to about 40% of the weight of the absorbent. Other materials like silicas and pharmasorb clays may be able to absorb about 20% to about 80% of the weight of the absorbent.

The general procedure for absorbing a bitterness inhibitor onto the absorbent is as follows. An absorbent like fumed silica powder can be mixed in a powder blender and an aqueous solution of a bitterness inhibitor can be sprayed onto the powder as mixing continues. The aqueous solution can be about 10% to 30% solids, and higher solid levels may be used if temperatures up to 90° C. are used. Generally water is the solvent, but other solvents like alcohol could also be used if approved for use in food. As the powder mixes, the liquid is sprayed onto the powder. Spraying is stopped before the mix becomes damp. The still free-flowing powder is removed from the mixer and dried to remove the water or other solvent, and is then ground to a specific particle size.

After the bitterness inhibitor is absorbed or fixed onto an absorbent, the fixative/inhibitor can be coated by encapsulation. Either full or partial encapsulation may be used, depending on the coating composition used in the process. Full encapsulation may be obtained by coating with a polymer as in spray drying, spray chilling, fluid-bed coating, coacervation, or any other standard technique. A partial encapsulation or coating can be obtained by agglomeration of the fixative inhibitor mixture using any of the materials discussed above.

Another form of encapsulation is by entrapment of an ingredient by fiber extrusion or fiber spinning into a polymer. Polymers that can be used for extrusion are PVAC, hydroxypropyl cellulose, polyethylene and other types of plastic polymers. A process of encapsulation by fiber extrusion is disclosed in U.S. Pat. No. 4,978,537, which is hereby incorporated by reference. The water insoluble polymer may be preblended with the bitterness inhibitor prior to fiber extrusion, or may be added after the polymer is melted. As the extrudate is extruded, it results in small fibers that are cooled and ground. This type of encapsulation/entrapment generally gives a very long, delayed release of an active ingredient.

The four primary methods to obtain a modified release of the bitterness inhibitor are: (1) encapsulation by spray drying, fluid-bed coating, spray chilling and coacervation to give full or partial encapsulation, (2) agglomeration to give partial encapsulation, (3) fixation or absorption which also gives partial encapsulation, and (4) entrapment into an extruded compound. These four methods, combined in any usable manner which physically modifies the release or dissolvability of the bitterness inhibitor, are included in this invention.

A method of modifying the release rate of the bitterness inhibitor from the chewing gum is to add the bitterness inhibitor to the dusting compound of a chewing gum. A rolling or dusting compound may be applied to the surface of chewing gum as it is formed. This rolling or dusting compound serves to reduce sticking of the chewing gum product to machinery as it is formed and as it is wrapped, and sticking of the product to its wrapper after it is wrapped and is being stored. The rolling compound comprises a bitterness inhibitor powder in combination with mannitol, sorbitol, sucrose, starch, calcium carbonate, talc, other orally acceptable substances or a combination thereof. The rolling compound constitutes from about 0.25% to about 10%, but preferably about 1% to about 3% by weight of the chewing gum composition. The amount of a bitterness inhibitor powder added to the rolling compound is about 0.05% to about 20% of the rolling compound or about 5 ppm to about 2000 ppm of the chewing gum composition. This method of using a bitterness inhibitor powder in the chewing gum allows for a lower usage level of the bitterness inhibitor, gives a bitterness inhibitor a fast release rate, reduces bitterness and reduces or eliminates any possible reaction with gum base, flavor components, or other components, yielding improved shelf stability.

Another method of modifying the release rate of a bitterness inhibitor is to use it in the coating/panning of a pellet chewing gum. Pellet or ball gum is prepared as conventional chewing gum, but formed into pellets that are pillow shaped or into balls. The pellets/balls can then be sugar coated or panned by conventional panning techniques to make a unique sugar coated pellet gum. The bitterness inhibitor may generally be very stable and highly water soluble and can be easily dispersed in a sugar solution prepared for sugar panning. The bitterness inhibitor can also be added as a powder blended with other powders often used in some types of conventional panning procedures. Using the bitterness inhibitor in a coating isolates it from other gum ingredients and modifies its release rate in chewing gum. Levels of the bitterness inhibitor may be about 100 ppm (0.01%) to about 25,000 ppm (2.5%) in the coating and about 50 ppm (0.005%) to about 10,000 ppm (1%) of the weight of the chewing gum product. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, palatinose, xylitol, lactitol, hydrogenated isomaltulose and other new alditols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum, and gum tragacanth, insoluble carbonates like calcium carbonate or magnesium carbonate and talc. Antitack agents may also be added as panning modifiers which allow for the use of a variety of carbohydrates and sugar alcohols in the development of new panned or coated gum products. Flavors may also be added with the sugar coating and with the bitterness inhibitor to yield unique product characteristics.

Another type of pan coating would also modify the release rate of the bitterness inhibitor from the chewing gum. This technique is referred to as film coating and is more common in pharmaceuticals than in chewing gum, but procedures are similar. A film like shellac, Zein, or cellulose-type material is applied onto a pellet-type product forming a thin film on the surface of the product. The film is applied by mixing the polymer, a plasticizer and a solvent (pigments are optional) and spraying the mixture onto the pellet surface. This is done in conventional type panning equipment, or in more advanced side-vented coating pans. When a solvent like alcohol is used, extra precautions are needed to prevent fires and explosions, and specialized equipment must be used.

Some film polymers can use water as the solvent in film coating. Recent advances in polymer research and in film coating technology eliminates the problem associated with the use of flammable solvents in coating. These advances make it possible to apply aqueous films to a pellet or chewing gum product. Since the bitterness inhibitor is highly water soluble, it may be added to this aqueous film solution and applied with the film to the pellet or chewing gum product. The aqueous film, or even the alcohol solvent film, in which the bitterness inhibitor is dispersed may also contain a flavor along with the polymer and plasticizer.

The previously described encapsulated, agglomerated or absorbed sodium glycinate, or sodium glycinate in a powder or solution form, may readily be incorporated into a chewing gum composition. The remainder of the chewing gum ingredients are noncritical to the present invention. That is, the bitterness inhibitor can be incorporated into conventional chewing gum formulations in a conventional manner. The sodium glycinate may be used in a sugar chewing gum or a sugarless chewing gum. The bitterness inhibitor may be used in either regular chewing gum or bubble gum.

In general, a chewing gum composition typically comprises a water-soluble bulk portion, a water-insoluble chewable gum base portion and typically water-insoluble flavoring agents. The water-soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer and styrene butadiene rubber, as well as natural latexes such as chicle. Resins include polyvinylacetate and terpene resins. Fats and oils may also be included in the gum base, including tallow, hydrogenated and partially hydrogenated vegetable oils, and cocoa butter. Commonly employed waxes include paraffin, microcrystalline and natural waxes such as beeswax and carnauba. According to the preferred embodiment of the present invention, the insoluble gum base constitutes between about 5% and about 95% by weight of the gum. More preferably the insoluble gum base comprises between about 10% and about 50% by weight of the gum, and most preferably between about 20% and about 35% by weight of the gum.

The gum base typically also includes a filler component. The filler component may be calcium carbonate, magnesium carbonate, talc, dicalcium phosphate or the like. The filler may constitute between about 5% and about 60% by weight of the gum base. Preferably, the filler comprises about 5% to about 50% by weight of the gum base.

Gum bases typically also contain softeners, including glycerol monostearate and glycerol triacetate. Further, gum bases may also contain optional ingredients such as antioxidants, colors, and emulsifiers. The present invention contemplates employing any commercially acceptable gum base.

The water-soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5% and about 15% by weight of the chewing gum. Softeners contemplated by the present invention include glycerin, lecithin and combinations thereof. Further, aqueous sweetener solutions such as those containing sorbitol, hydrogenated starch hydrolyzates, corn syrup and combinations thereof may be used as softeners and binding agents in gum.

As mentioned above, the sodium glycinate bitterness inhibitor of the present invention may be used in sugar or sugarless gum formulations, although sugar gum formulations are presently preferred. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination. Sugarless sweeteners include components with sweetening characteristics but which are devoid of the commonly known sugars and comprise, but are not limited to, sugar alcohols such as sorbitol, mannitol, xylitol, hydrogenated starch hydrolyzates, maltitol and the like, alone or in any combination.

Depending on the particular bitterness inhibitor release profile and shelf-stability needed, the sodium glycinate bitterness inhibitor of the present invention can also be used in combination with uncoated high-potency sweeteners or with high-potency sweeteners coated with other materials and by other techniques.

A flavoring agent may also be present in the chewing gum in an amount within the range of from about 0.1% to about 15%, preferably from about 0.5% to about 3%, by weight of the gum. The flavoring agents may comprise essential oils, synthetic flavors, or mixtures thereof including, but not limited to oils derived from plants and fruits such as citrus oils, fruit essences, peppermint oil, spearmint oil, clove oil, oil of wintergreen, anise, and the like. Artificial flavoring components are also contemplated for use in gums of the present invention. Those skilled in the art will recognize that natural and artificial flavoring agents may be combined in any sensorally acceptable blend. All such flavors and flavor blends are contemplated by the present invention.

Optional ingredients such as colors, emulsifiers and pharmaceutical agents may be added to the chewing gum.

In general, chewing gum is manufactured by sequentially adding the various chewing gum ingredients to a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time, along with syrup and a portion of the bulking agent. Further portions of the bulking agent may then be added to the mixer. A flavoring agent is typically added with the final portion of the bulking agent. The coated bitterness inhibitor of the present invention is preferably added after the final portion of bulking agent and flavor have been added.

The entire mixing procedure typically takes from five to fifteen minutes, but longer mixing times may sometimes be required. Those skilled in the art will recognize that many variations of the above described procedure may be followed.

The following examples of the invention and comparative examples are provided by way of explanation and illustration.

Gum was made from the following formulas:

|  | Formula A | Formula B |
| --- | --- | --- |
| Base | 21.2 | 19.1 |
| Sugar | 52.0 | 53.93 |
| Corn Syrup | 12.5 | 12.5 |
| Dextrose | 9.9 | 9.9 |
| Wintergreen Flavor | 1.4 | 0.9 |
| Encapsulated Wintergreen Flavor | 0.9 | 0.8 |
| Encapsulated Menthol | 0.3 | 0.3 |
| Encapsulated High Intensity Sweeteners | 0.31 | 0.58 |
| Lecithin | 0.13 | 0.13 |
| Color | 0.06 | 0.06 |
| Glycerin | 1.3 | 1.3 |
| Menthol and Artificial Cooling Agents | — | 0.5 |
|  | 100.00 | 100.00 |

EXAMPLES A AND 1–3

Comparative Example A—Formula A

Example 1—0.25% Sodium Glycinate was added to Formula A

Example 2—0.50% Sodium Glycinate was added to Formula A

Example 3—1.0% Sodium Glycinate was added to Formula A

Sensory evaluation indicated that the overall bitterness of the gum of Examples 1–3 was significantly reduced compared to Comparative Example A. Also, Examples 2 and 3, with 0.5% and 1.0% sodium glycinate, had a much softer texture than comparative Example A.

EXAMPLES B AND 4–5

Comparative Example B—Formula B

Example 4—0.25% Sodium Glycinate was added to Formula B

Example 5—0.40% Sodium Glycinate was added to Formula B

Sensory evaluation of Examples 4 and 5 compared to Comparative Example B indicated that all three examples had good high flavor with cooling, but Examples 4 and 5 had much less bitterness.

It should be appreciated that the methods and compositions of the present invention are capable of being incorporated in the form of a variety of embodiments, only a few of which have been illustrated and described above. The invention may be embodied in other forms without departing from its spirit or essential characteristics. It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention. However, the described embodiments are to be considered in all respects only as illustrative and not restrictive, and the scope of the invention is, therefore, indicated by the appended claims rather than by the foregoing description. All changes which come within the meaning and range of equivalency of the claims are to be embraced within their scope.

We claim:

1. A chewing gum composition comprising:
   a) about 5% to about 95% gum base;
   b) about 5% to about 95% bulking and sweetening agents;
   c) about 0.1% to about 15% flavor; and
   d) about 0.02% to about 5% sodium glycinate.

2. The chewing gum composition of claim 1 further comprising an ingredient which gives the chewing gum composition a bitter taste.

3. The chewing gum composition of claim 2 wherein the bitter tasting ingredient is selected from the group consisting of caffeine, peppermint oil, menthol, spearmint oil, oil of wintergreen, physiological cooling agents and medicants.

4. The chewing gum composition of claim 1 wherein the sodium glycinate is present at a level of between about 0.05% and about 2%.

5. The chewing gum composition of claim 1 wherein the sodium glycinate is present at a level of between about 0.1% and about 1%.

6. The chewing gum composition of claim 1 wherein the sodium glycinate is treated to modify its rate of release from the chewing gum.

7. The chewing gum composition of claim 6 wherein the sodium glycinate is treated by encapsulation.

8. The chewing gum composition of claim 6 wherein the sodium glycinate is treated by agglomeration.

9. The chewing gum composition of claim 6 wherein the sodium glycinate is treated by fixation.

10. The chewing gum composition of claim 6 wherein the sodium glycinate is treated by entrapment.

11. A chewing gum product made from the chewing gum composition of claim 1.

12. The chewing gum product of claim 11 wherein the sodium glycinate is present in a dusting compound used on the product.

13. The chewing gum product of claim 11 wherein the sodium glycinate is present in a coating applied to the gum.

14. The chewing gum product of claim 1 wherein the bulking and sweetening agents comprise sugar and glucose syrup.

15. A method of making a chewing gum product with reduced bitterness comprising the steps of:
   a) mixing about 5% to about 95% gum base, about 5% to 95% bulking and sweetening agents, and about 0.1% to about 15% flavor to form a chewing gum composition, the chewing gum including an ingredient which gives the chewing gum composition a bitter taste; and
   b) while making the gum composition, adding sodium glycinate in an amount sufficient to provide the gum composition with suppressed bitterness.

16. The method of claim 15 wherein the sodium glycinate is treated so as to modify its release rate from chewing gum before being mixed into the gum composition.

17. The method of claim 15 wherein the sodium glycinate is present at a level of between about 0.02% and about 5%.

* * * * *